United States Patent
Goh et al.

(10) Patent No.: US 12,341,880 B2
(45) Date of Patent: Jun. 24, 2025

(54) QUANTUM KEY TOKEN

(71) Applicant: NATIONAL UNIVERSITY OF SINGAPORE, Singapore (SG)

(72) Inventors: Koon Tong Goh, Singapore (SG); Chee Ping George Loh, Singapore (SG); Ci Wen Lim, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 212 days.

(21) Appl. No.: 18/255,911

(22) PCT Filed: Nov. 30, 2021

(86) PCT No.: PCT/SG2021/050737
§ 371 (c)(1),
(2) Date: Jun. 5, 2023

(87) PCT Pub. No.: WO2022/124984
PCT Pub. Date: Jun. 16, 2022

(65) Prior Publication Data
US 2024/0097890 A1    Mar. 21, 2024

(30) Foreign Application Priority Data
Dec. 7, 2020    (SG) .............. 10202012172Q

(51) Int. Cl.
*H04L 9/08*    (2006.01)
*G06F 7/58*    (2006.01)

(52) U.S. Cl.
CPC ............ *H04L 9/0852* (2013.01); *G06F 7/588* (2013.01)

(58) Field of Classification Search
CPC .............................. H04L 9/0852; G06F 7/588
See application file for complete search history.

(56) References Cited

U.S. PATENT DOCUMENTS 8,340,298 B2    12/2012    Gelfond et al.
8,483,394 B2 *   7/2013    Nordholt ............... H04L 63/062
                                                          380/278
(Continued)

FOREIGN PATENT DOCUMENTS

| CN | 106789052 A | 5/2017 |
| CN | 110489987 A | 11/2019 |
| CN | 110620669 A | 12/2019 |
| EP | 3040853 B1 | 7/2016 |
| JP | 2013207354 A | 10/2013 |

OTHER PUBLICATIONS

Han et al., "Enhancing Data and Privacy Security in Mobile Cloud Computing through Quantum Cryptography", 7th IEEE International Conference on Software Engineering and Service Science (ICSESS), 2016: 398-401.

(Continued)

*Primary Examiner* — Viral S Lakhia
(74) *Attorney, Agent, or Firm* — Michael Best & Friedrich LLP

(57) ABSTRACT

A method of using a quantum random number generator, QRNG, for security applications, a system for security applications, and a user device for a system for security applications. The method comprises the steps of generating one or more quantum keys using the QRNG; storing, using a secure network, corresponding sets of the quantum keys in a server located at a controlled access location and in a quantum key token, QKT, for a user, respectively; and using the corresponding sets of quantum keys for secure transmission between the server and a user device comprising the QKT when outside the secure network or for access control to the controlled access location.

19 Claims, 5 Drawing Sheets

(56) References Cited

U.S. PATENT DOCUMENTS

| | | | |
|---|---|---|---|
| 8,693,691 B2 | 4/2014 | Jacobs | |
| 9,830,467 B1 | 11/2017 | Harold | |
| 10,574,461 B2* | 2/2020 | Hughes | H04L 9/0852 |
| 10,790,972 B2* | 9/2020 | Kent | H04L 9/0852 |
| 11,240,223 B1* | 2/2022 | Stapleton | G06F 21/72 |
| 11,343,084 B2* | 5/2022 | Nix | H04L 9/304 |
| 11,362,818 B2* | 6/2022 | Chen | H04L 9/0852 |
| 11,424,918 B2* | 8/2022 | Hay | H04L 9/14 |
| 11,469,888 B2* | 10/2022 | McCandlish | G06F 21/86 |
| 11,728,980 B2* | 8/2023 | Vtyurina | G06F 21/72 713/155 |
| 12,058,248 B2* | 8/2024 | Williams | H04L 9/0855 |
| 2013/0083926 A1 | 4/2013 | Hughes et al. | |
| 2017/0010865 A1 | 1/2017 | Sanguinetti et al. | |
| 2019/0220250 A1 | 7/2019 | Shi et al. | |
| 2020/0379734 A1 | 12/2020 | Grant | |

OTHER PUBLICATIONS

M. Stipčević, "Quantum random number generators and their use in cryptography", 2011 Proceedings of the 34th International Convention MIPRO, 2011.

True random number generation exploiting quantum physics <https://www.idquantique.com/random-number-generation/overview/>.

Jouguet et al., "Field test of classical symmetric encryption with continuous variables quantum key distribution", Optics Express, 2012 : 14030-14041.

Singapore researchers tapping quantum cryptography to enhance network encryption <https://www.zdnet.com/article/singapore-researchers-tapping-quantum-cryptography-to-enhance-network-encryption/>.

International Search Report and Written Opinion for Application No. PCT/SG2021/050737, dated Jan. 14, 2022 (9 pages).

European Patent Office Extended Search Report for Application No. 21903971.6 dated Nov. 5, 2024 (9 pages).

* cited by examiner

QUANTUM KEY TOKEN

CROSS REFERENCE TO RELATED APPLICATIONS

This application is a national stage filing under 35 U.S.C. § 371 of International Patent Application No.: PCT/SG2021/050737, filed Nov. 30, 2021, which claims priority to Singapore Patent Application No. 10202012172Q, filed Dec. 7, 2020, the entire contents of all of which are hereby incorporated by reference herein.

FIELD OF INVENTION

The present invention relates broadly to a method and system for using a quantum random number generator, QRNG, for security applications.

BACKGROUND

Any mention and/or discussion of prior art throughout the specification should not be considered, in any way, as an admission that this prior art is well known or forms part of common general knowledge in the field.

There are a number of existing cryptographic protocols including:

1. Asymmetric Key Exchange: Asymmetric key exchange (such as Diffie-Hellman or Lattice-based key exchange) are used extensively to distribute keys to perform symmetric key encryption. However, the security of these protocols depends on the hardness of the mathematical problem. However, the development of new computers and algorithms means that an adversary is able to solve some of these mathematical problems efficiently.
2. Quantum Key Distribution (QKD): QKD can provide higher level of security that does not depend on the adversary's computational power, but it requires the transmission of quantum signals which heavily impedes its range and speed.
3. Key generation based on pseudorandom number generators (PRNG): Most of the secret keys used for communication today are generated with PRNG which are susceptible to random number generator attacks.
4. Security tokens for authentication: Most security tokens such as key fobs and identification cards have a unique identifier code that does not change. This means such security tokens will be vulnerable to replay attacks.

Embodiments of the present invention seek to address at least one of the above problems.

SUMMARY

In accordance with a first aspect of the present invention, there is provided a method of using a quantum random number generator, QRNG, for security applications, the method comprising the steps of:
  generating one or more quantum keys using the QRNG;
  storing, using a secure network, corresponding sets of the quantum keys in a server located at a controlled access location and in a quantum key token, QKT, for a user, respectively; and
  using the corresponding sets of quantum keys for secure transmission between the server and a user device comprising the QKT when outside the secure network or for access control to the controlled access location.

In accordance with a second aspect of the present invention, there is provided a system for security applications, the system comprising:
  a quantum random number generator, QRNG, for generating one or more quantum keys;
  a secure network comprising a server and a user device comprising a quantum key token, QKT, wherein corresponding sets of the quantum keys are stored in the server located at a controlled access location and in the QKT, respectively; and
  wherein the server and the user device are configured for using the corresponding sets of quantum keys for secure transmission between the server and the user device when located outside the secure network or for access control to the controlled access location.

In accordance with a third aspect of the present invention, there is provided a user device for a system for security applications, the user device comprising a quantum key token, QKT, configured for storing a set of quantum keys generated by a quantum random number generator, QRNG, via the secure network; and
  wherein the user device is configured for using the set of quantum keys for secure transmission with a server located at a controlled access location when the user device is located outside the secure network or for access control to the controlled access location.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

The quantum key token (QKT) protocol according to an example embodiment allows users to perform secure symmetric key encryption and authentication with a server that is robust against random number generator attacks and replay attacks. The protocol according to an example embodiment uses the presence of a secured area with restricted access where the quantum keys will be generated and loaded/re-loaded into the tokens and the users of the tokens have to frequent this area regularly. Although the protocol according to an example embodiment can be implemented using commercially available equipment, the level of security it offers can meet requirements for the official duties of VIPs such as head of states and the military.

Figure 1:
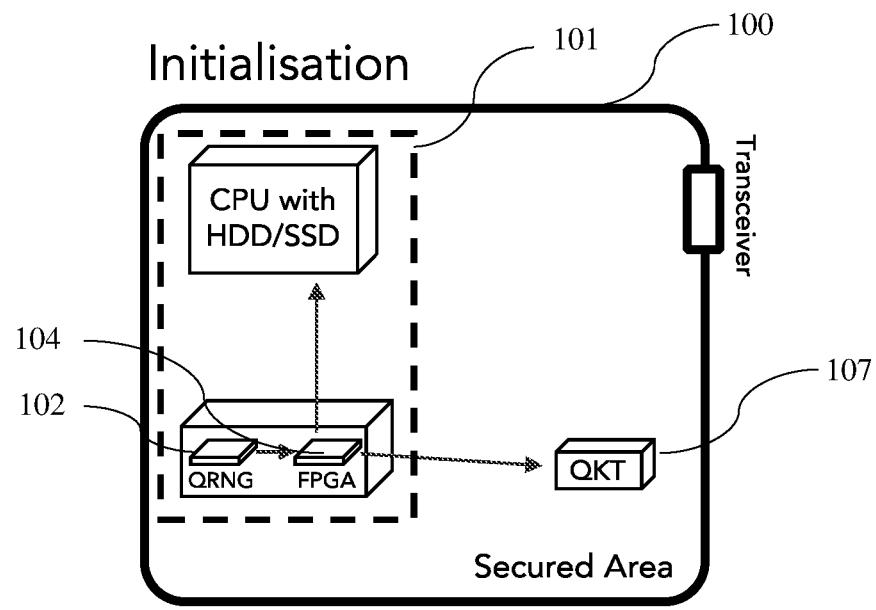
FIG. 1 shows a schematic drawing illustrating initialisation of a secure communication protocol using Quantum Key Token, according to an example embodiment.

According to an example embodiment, it is assumed that the vicinity around the server within a given perimeter is secure i.e. any information reveal in this vicinity does not leak to the adversary. With reference to FIG. 1, the protocol according to an example embodiment will be initialized with the user residing in that secured vicinity 100 around the server 101.

The server will then generate a string of random numbers using a quantum random number generator (QRNG) 102.

Using a randomness extractor 104, the server 101 will shorten the string of random numbers into an encryption key with length not larger than its quantum entropy.

This encryption key will then be stored, using a secure network, in the storage of the server 101 and a device 106 of the user, as part of what is referred to herein as the quantum key token (QKT) 107, according to an example embodiment. The QKT 107 is compartmentalized into two portions: the encryption keys (use thereof described in detail with refence to FIGS. 1 to 4) and the authentication keys (use thereof described in detail with reference to FIGS. 5 to 8). The keys are stored with an index to facilitate authentication, encryption and decryption between the server 101 and the QKT 107.

Once the user leaves the secure vicinity 100 with his/her QKT 107, the device 106 (with QKT 107 incorporated therein) serves two purposes: symmetric key encryption and authentication.

Figure 2:
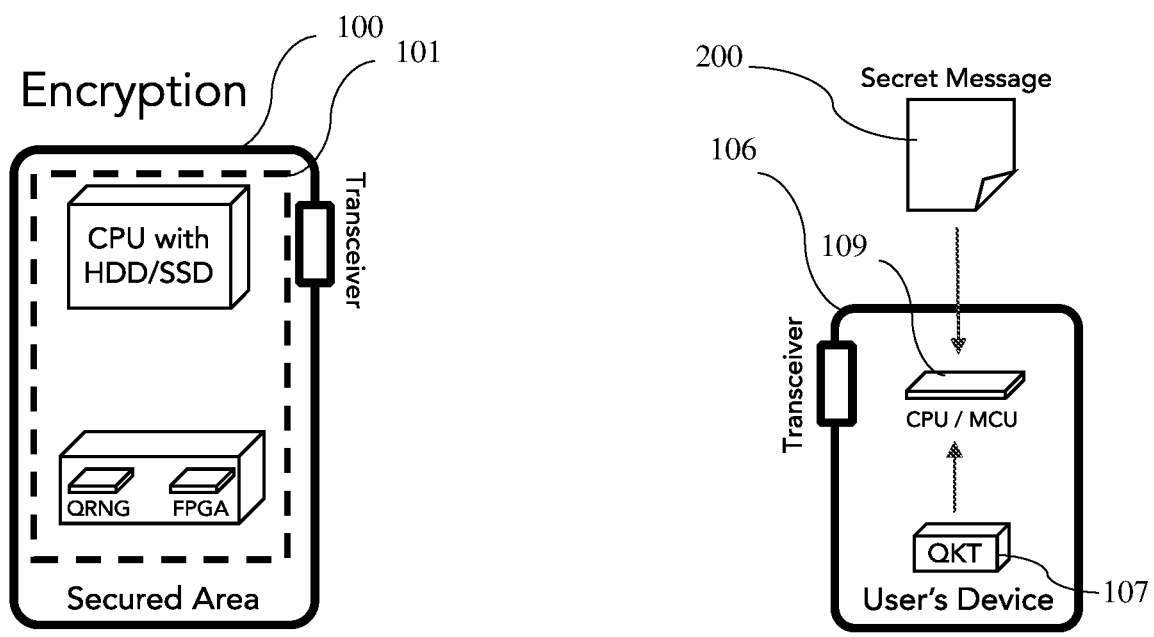
FIG. 2 shows a schematic drawing illustrating encryption in a secure communication protocol using Quantum Key Token, according to an example embodiment.

With reference to FIG. 2, in a symmetric key encryption protocol according to an example embodiment, the user can use the encryption key loaded in the QKT 107 to perform a symmetric key encryption to the server 101 via One Time Pad (OTP) using user's device 106. As will be appreciated by a person skilled in the art, OTP (or Vernam cipher) is a standard term used for a specific encryption scheme that is provably unbreakable. It generally specifies the key used to be random, never to be revealed or/and reused as well as the length of the key to be at least the size of the message. These are the features we used from OTP according to an example embodiment. QKT 107 can be used in conjunction with various trusted communication devices that are installed with software that can execute the QKT protocol, as generally indicated as CPU/Microcontroller Unit (MCU) 109 in FIG. 2. Since the quantum key length is not larger than its quantum entropy, the protocol according to an example embodiment is not susceptible to random number generator attacks. More specifically, if the length of the key is not larger than its quantum entropy, the optimal strategy for an adversary to guess the key correctly is a random guess, even if he/she has unlimited computational resources. The use of the abovementioned features from OTP with information-theoretic secure keys advantageously guarantees the transmission of the ciphertext to be information-theoretic secure i.e. the security of the transmission is independent of the computation resource of the adversary and even if the adversary guesses the key correctly, he/she will not be able to verify it.

More specifically, the user will hash the message 200 using a hashing algorithm with sufficient avalanche effect that is specified by the security parameter. Examples of such algorithms include SHA-2 and SHA-3.

Figure 3:
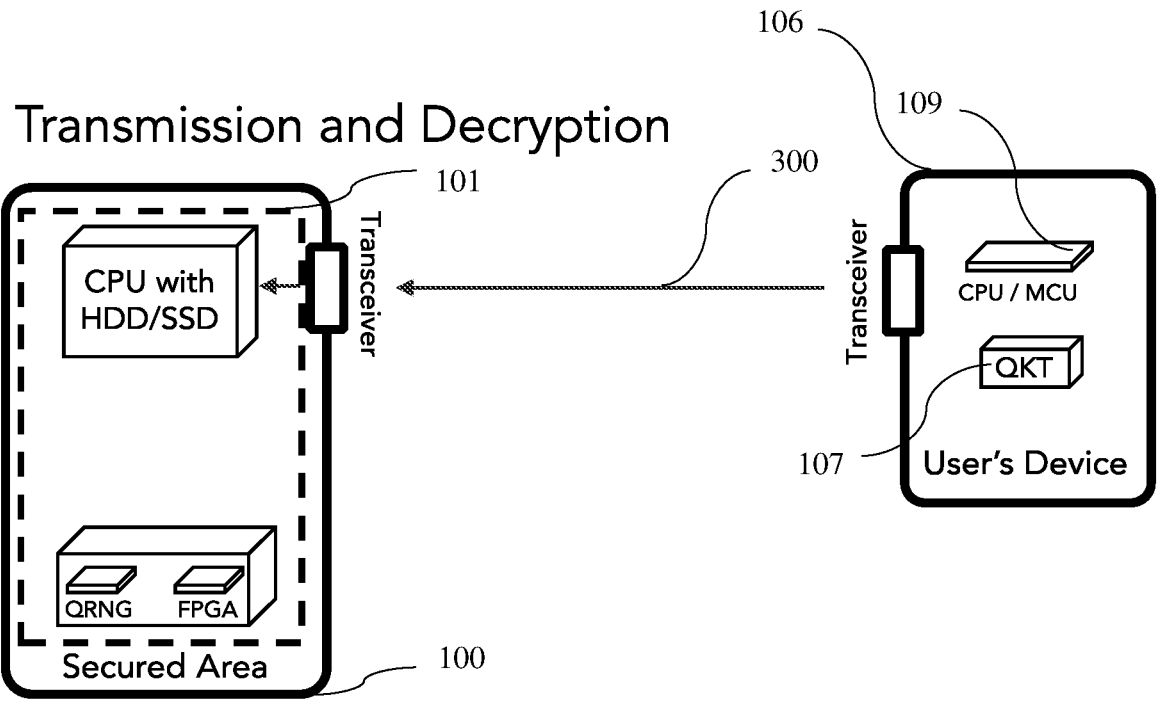
FIG. 3 shows a schematic drawing illustrating transmission and decryption in a secure communication protocol using Quantum Key Token, according to an example embodiment.

Next, the user will encrypt the message and its message digest into the ciphertext using OTP and transmit the ciphertext to the server 101 through a potentially unsecure channel 300, as shown in FIG. 3. Digest encryption/decryption is used in an example embodiment to authenticate the ciphertext's integrity, i.e. to avoid that an adversary could in principle, change the message even though he/she cannot learn the content of the message.

The server 101 will then decrypt the ciphertext using its key and compare the message and the digest. If the message and the digest is compatible, it proves that the ciphertext has not been altered (integrity of the ciphertext is preserved). Furthermore, since only the user has the exact same key, the matching of the decrypted message and its digest authenticates the identity of the sender and the transmission is also non-repudiable, which means that the sender could not deny the fact that he/she sent the message since only he/she (other than the server 101) possesses the key. These security features are in addition to the confidentiality property of the protocol.

At the end of the protocol, both the user's QKT 107 and the server 101 will delete the quantum keys used for the encryption of the message and its digest. In an example embodiment, if the matching is unsuccessful, the receiver, e.g. the server 101, will have to request the sender to resend the same ciphertext for a pre-determined number of retries. If the resending of the same ciphertext could not resolve the problem, the receiver will have to request the sender to encrypt the message using another set of keys and both the sender and receiver will delete the previously used keys.

Information-theoretic secure keys in the protocol according to an example embodiment is made possible because the key is generated from a quantum process. Otherwise, an adversary with the knowledge about the specifications of the entropy source and sufficiently powerful computer can always predict the bits generated from the random number generator and hence, breaking the protocol. On the other hand, the protocol according to an example embodiment, where the key is generated from a quantum process, will advantageously not be susceptible to such random number generator attacks. As will be appreciated by a person skilled in the art, certifying that the QRNG is indeed generating random numbers by performing quantum operations can be done by several methods such as performing a proper modelling of the physical processes within the QRNG, checking the violation of Bell inequalities etc. The randomness of the output generated by the QRNG can be quantified by its entropy. While it is often difficult to precisely determine the exact amount of entropy present in the QRNG's output, one can typically lower bound the amount of entropy present in the output via modelling/calculations. For example, one can observe the input-output statistics of the QRNG, consider the assumptions made on the physical processes of the QRNG and consider the assumptions made on the resources and information afforded to the adversaries. Based on the computed value, the raw output from the QRNG can be shorten to a length not longer than the entropy present, to ensure the post-processed random bits from the QRNG can be fully secure against any adversaries in a preferred embodiment.

It is noted that a corresponding protocol can be followed for correspondence between the server 101 as the sender, and the user's QKT 107 as the recipient.

It is noted that the protocol according to an example embodiment can also be used for different users communicate securely amongst one another. This can be implemented based on secure server-user communication as described above, i.e. with the server as relay. That is, provided that the users can each securely communicate with the server and vice-versa based on the protocol according to an example embodiment such as described above, User A can communicate his/her message to User B via the Server as a relay. In one example embodiment, User A encrypts and sends a secret message to the Server securely. In turn, the Server decrypts, re-encrypts and sends the message to User B. In another example embodiment, the server can perform the XOR between the keys on Users A and B's token.

Figure 4:
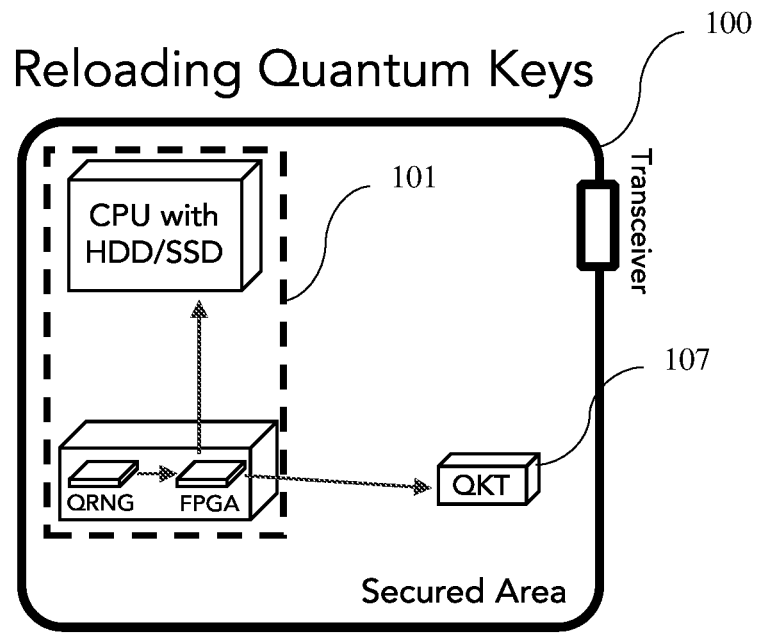
FIG. 4 shows a schematic drawing illustrating reloading of quantum keys for a secure communication protocol using Quantum Key Token, according to an example embodiment.

The user can also use the key loaded in the QKT 107 according to an example embodiment to perform authentication applications such as security access pass or token. Since the vicinity 100 around the server 101 is secured, the entry to this area is locked and is only accessible to authorized personnel. As such, since QKT 107 is only assigned to authorized users, they can be used as a way to authenticate the identifications of the users in order to grant access into the secured vicinity 100, for example for reloading of quantum keys in the QKT 107, as illustrated in FIG. 4.

Figure 5:
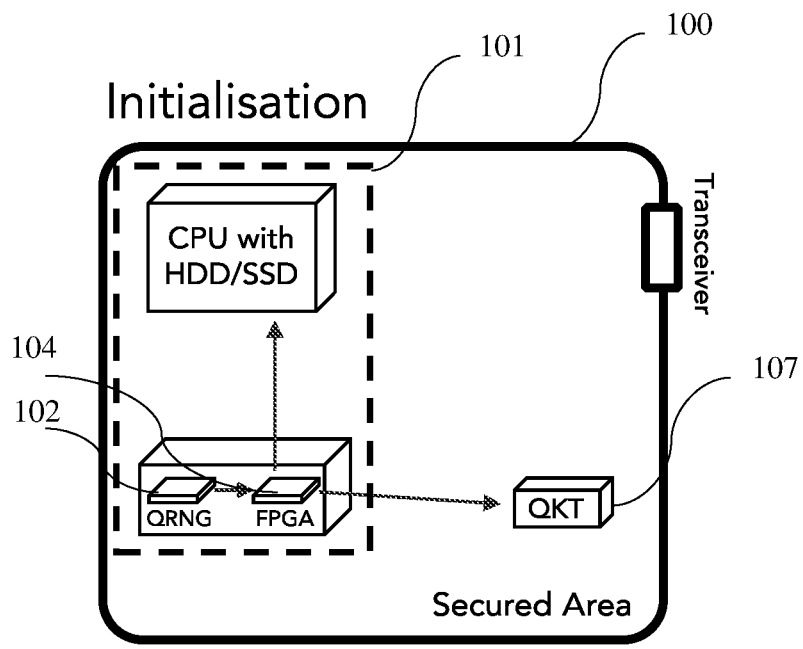
FIG. 5 shows a schematic drawing illustrating initialisation of an authentication protocol using Quantum Key Token, according to an example embodiment.

More generally, an authentication protocol according to an example embodiment will now be described. With reference to FIG. 5, the protocol according to example embodiments will similarly be initialized with the user residing in that secured vicinity 100 around the server 101.

The server will then generate a string of random numbers using a quantum random number generator (QRNG) 102. Using the randomness extractor 104, the server 101 will shorten the string of random numbers into an authentication key with specified length. This authentication key will then be stored, using a secure network, in the storage of the server 101 and the device 106 of the user, as part of the QKT 107, according to example embodiments.

Figure 6:
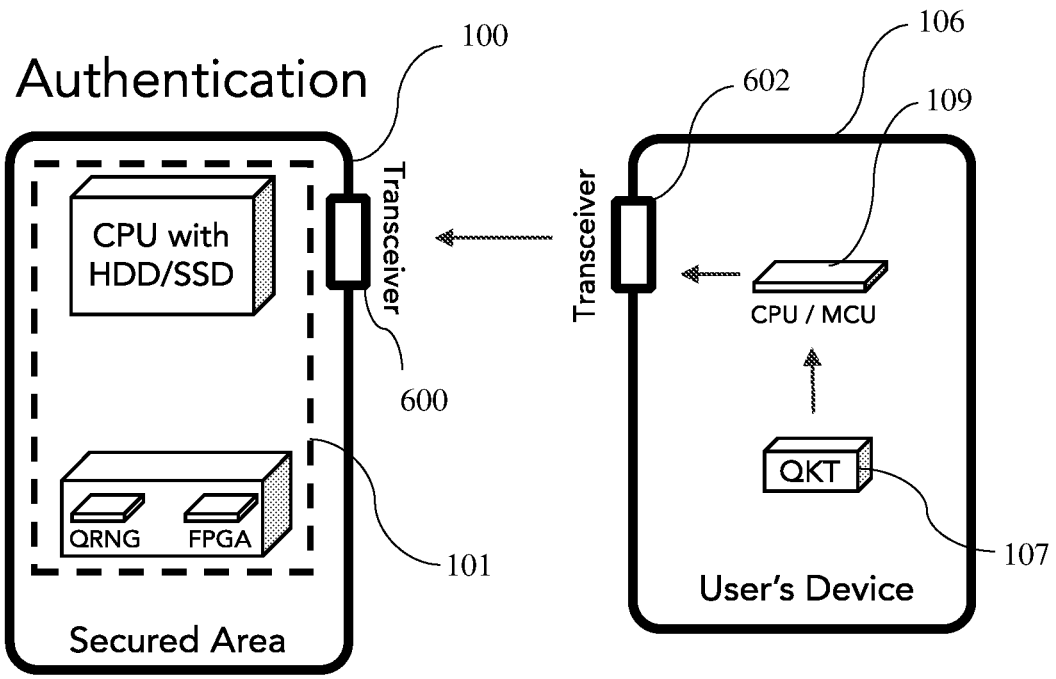
FIG. 6 shows a schematic drawing illustrating authentication in an authentication protocol using Quantum Key Token, according to an example embodiment.

With reference to FIG. 6, the user will later attempt to unlock the entry of the secured vicinity 100 by transmitting the authentication keys from his/her QKT 107 into the transceiver 600 mounted near the entry via near-field communication (NFC) from the transceiver 602 on the user's device 106. The length of the authentication keys used would depend on the security parameter deemed acceptable by the organization employing the authentication protocol according to example embodiments.

Figure 7:
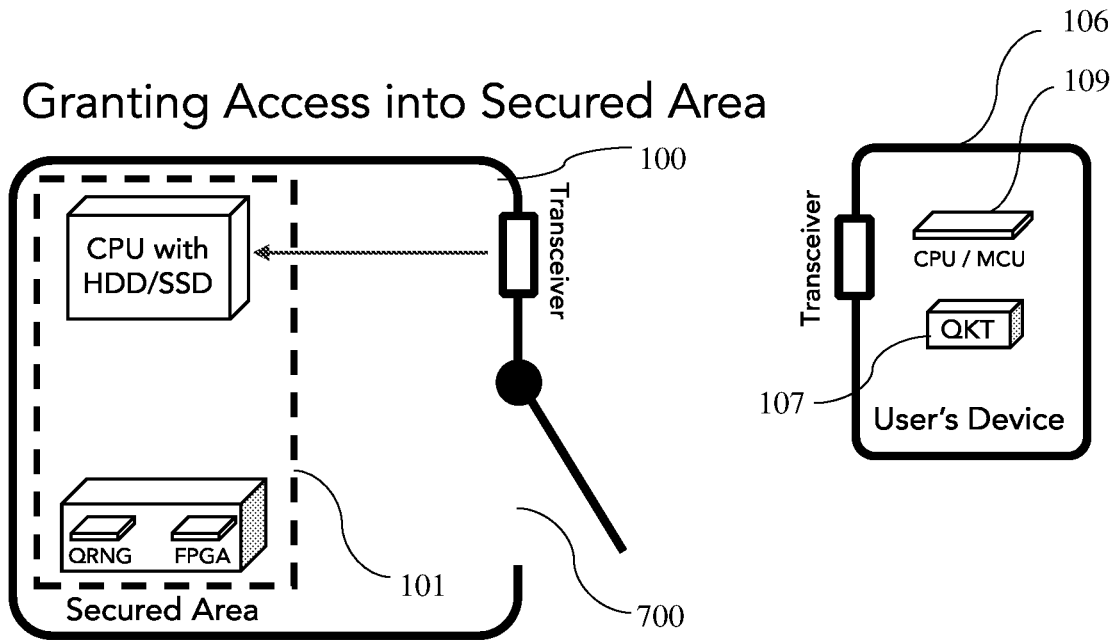
FIG. 7 shows a schematic drawing illustrating granting access into a secured area in an authentication protocol using Quantum Key Token, according to an example embodiment.
Figure 8:
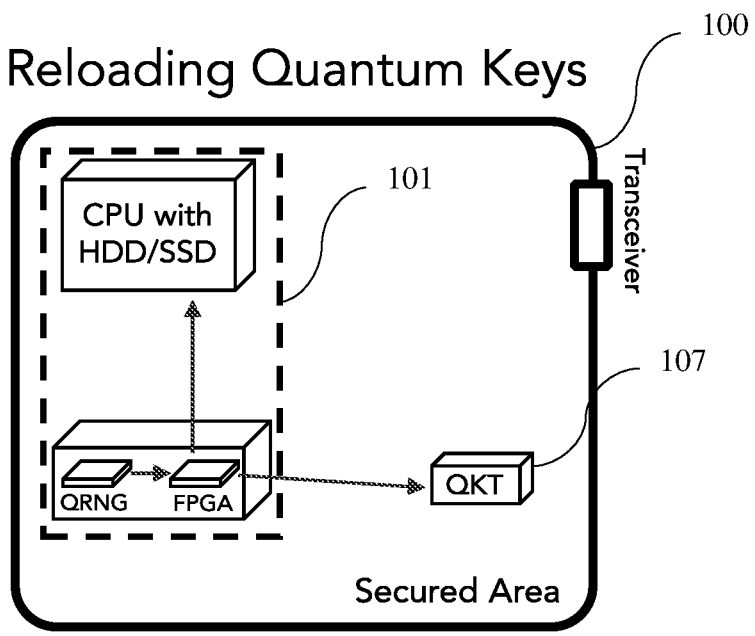
FIG. 8 shows a schematic drawing illustrating reloading of quantum keys for an authentication protocol using Quantum Key Token, according to an example embodiment.

With reference to FIG. 7, the entry 700 of the secured area 101 will unlock if and only if the authentication key matches the key stored in the server 101. After these procedures, the server 101 and the QKT 107 will erase the quantum keys used for authentication. In an example embodiment, if authentication is unsuccessful, the users will be given a pre-determined number of retries. If the number of unsuccessful attempts exceeds the threshold, an alarm will be activated, the vicinity locked down and the users notified. Legitimate users will then be required to use the subsequent keys to authenticate to reset the alarm. Similarly, access may be sought by the user for reloading of quantum keys in the QKT 107, as illustrated in FIG. 8.

In the authentication protocol according to an example embodiment, a key is never used more than once and this is to prevent replay attacks that is a common vulnerability for many security token and ID card access schemes. This attack is performed by an adversary who copies the transmitted authentication key or radio frequency identification (RFID) and "replay" the key to the receiver or the card reader of the locked entry. This will grant the adversary an unauthorized access to the secured area. Moreover, the authentication protocol according to an example embodiment, like the above symmetric key encryption protocol according to an example embodiment, derives its key from quantum processes and is hence, with proper modelling of the QRNG, immune to random number generator attacks.

As described above, for any organization based in secured localities with authorized personnel frequenting these controlled areas regularly, QKT according to an example embodiment offers unprecedented security for communication and authentication. As described in the background section, the current prevalent means of generating key is via pseudo-random number generators, which are vulnerable to random number generator attacks while other means of distributing quantum keys such as quantum key distribution has limited range and asymmetric key exchange is not information-theoretic secure. Hence, for such organizations, QKT according to an example embodiment fills the security gap for communication over unsecure channels and access control. Indeed, the majority of the organizations across government, military, banking, petrol exploration and security sectors are structured this way.

QKT according to an example embodiment can also be used as an authentication security token exclusively, or as a secure communication key token exclusively, or as both authentication security token and secure communication key token.

QKT according to an example embodiment uses the keys generated by quantum process only once and hence, circumventing the threat of both replay attack and random number generator attack. In addition, the equipment required to construct the devices to implement a QKT protocol according to an example embodiment are readily available: Microcontrollers, QRNG chip, field-programmable gate arrays, flash memory and near field communication (NFC) transceivers.

In most security frameworks, it is assumed that any security token is secure when in possession of the user. However, in practice it is easier to secure a single small form security device than multiple devices/artefacts for various security applications. QKT according to an example embodiment has the additional advantage of incorporating both quantum keys for secure communication and for access authentication to restricted area in a single small form device.

Figure 9:
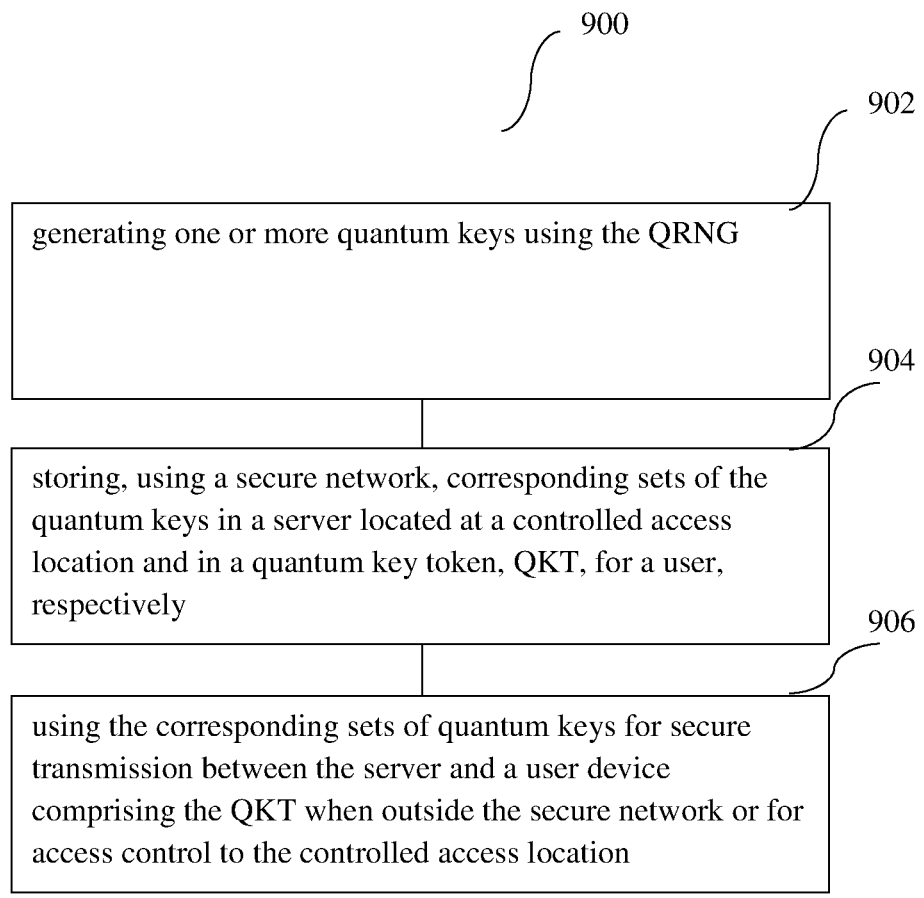
FIG. 9 shows a flowchart illustrating a method of using a quantum random number generator, QRNG, for security applications, according to an example embodiment.

FIG. 9 shows a flowchart 900 illustrating a method of using a quantum random number generator, QRNG, for security applications, according to an example embodiment. At step 902, one or more quantum keys are generated using the QRNG. At step 904, corresponding sets of the quantum keys are stored, using a secure network, in a server located at a controlled access location and in a quantum key token, QKT, for a user, respectively. At step 906, the corresponding sets of quantum keys are used for secure transmission between the server and a user device comprising the QKT when outside the secure network or for access control to the controlled access location.

Generating the quantum keys may comprise generating one or more quantum encryption keys and one or more quantum access control keys, wherein the quantum encryption keys are configured for use in the secure transmission and the quantum access control keys are configured for use in the access control.

Generating the quantum encryption keys may comprise limiting a length of the quantum encryption keys to be not greater than the quantum entropy of the keys generated by the QRNG via a randomness extractor.

The method may further comprise deleting the quantum keys from the server and the QKT after each use in the secure transmission or the access control.

Generating the quantum keys may comprise using a randomness extractor coupled to the QRNG. The randomness extractor may be executed by a field programmable gate array, FPGA.

Using the quantum key in the secure transmission may comprise encrypting/decrypting a message and its digest using the quantum key.

Using the quantum key in the secure transmission may comprise using the server as a relay for secure transmissions between users.

In one embodiment, a system for security applications is provided, the system comprising:
- a quantum random number generator, QRNG, for generating one or more quantum keys;
- a secure network comprising a server and a user device comprising a quantum key token, QKT, wherein corresponding sets of the quantum keys are stored in the server located at a controlled access location and in the QKT, respectively; and
- wherein the server and the user device are configured for using the corresponding sets of quantum keys for secure transmission between the server and the user device when located outside the secure network or for access control to the controlled access location.

The QRNG may be configured for generating one or more quantum encryption keys and one or more quantum access control keys, wherein the quantum encryption keys are configured for use in the secure transmission and the quantum access control keys are configured for use int the access control.

The QRNG may be configured for limiting a length of the quantum encryption keys to be not greater than the quantum entropy of the keys generated by the QRNG via a randomness extractor.

The server and the user device may be configured for deleting the quantum keys from the server and the QKT after each use in the secure transmission or the access control.

The QRNG may be configured for using a randomness extractor coupled to the QRNG. The randomness extractor may be executed by a field programmable gate array, FPGA.

The user device and the server may be configured for encrypting/decrypting a message and its digest using the quantum key.

The server may be configured to function as a relay for secure transmissions between users.

In one embodiment, a user device for a system for security applications is provided, the user device comprising a quantum key token, QKT, configured for storing a set of quantum keys generated by a quantum random number generator, QRNG, via the secure network; and
- wherein the user device is configured for using the set of quantum keys for secure transmission with a server located at a controlled access location when the user device is located outside the secure network or for access control to the controlled access location.

The quantum keys may comprise one or more quantum encryption keys and one or more quantum access control keys, wherein the quantum encryption keys are configured for use in the secure transmission and the quantum access control keys are configured for use int the access control.

A length of the quantum encryption keys may be limited to be not greater than the quantum entropy of the keys generated by the QRNG via a randomness extractor.

The user device may be configured for deleting the quantum keys from the server and the QKT after each use in the secure transmission or the access control.

The user device may be configured for encrypting/decrypting a message and its digest using the quantum key.

The system for security applications may be the system for security applications according to an example embodiment.

Industrial applications of an embodiment of the present invention can include:
- Secure communication (e.g. transmission of messages such as text, images, audio and videos)
- Security of area with restricted access (e.g. offices, laboratory, military assets, homes, automobile Embodiments of the present invention can have one or more of the following features and associated benefits/advantages:

| Feature | Benefit/Advantage |
|---|---|
| Quantum Randomness | Secret keys of quantum key tokens originate from quantum processes and are intrinsically random and thus, immune to random number generator attacks. |
| Dual functionalities: Secure communication and Authentication | It is easier to keep one device secure than multiple devices/artefacts for various security applications. The usage of one-time pad for secure communication and one-time password for authentication using quantum key boast information theoretic security. This meant that the protocol is immune to any computational attacks and replay attacks. |

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. When received into any of a variety of circuitry (e.g. a computer), such data and/or instruction may be processed by a processing entity (e.g., one or more processors).

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. Also, the invention includes any combination of features described for different embodiments, including in the summary section, even if the feature or combination of features is not explicitly specified in the claims or the detailed description of the present embodiments.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The invention claimed is:

1. A method of using a quantum random number generator (QRNG) for security applications, the method comprising the steps of:
   generating one or more quantum keys using the QRNG, including one or more quantum encryption keys;
   storing, using a secure network, corresponding sets of the quantum keys in a server located at a controlled access location and in a quantum key token (QKT) for a user, respectively; and
   using the corresponding sets of quantum keys for secure transmission between the server and a user device comprising the QKT when outside the secure network or for access control to the controlled access location,
   wherein generating the quantum encryption keys comprises limiting a length of the quantum encryption keys to be not greater than the quantum entropy of the keys generated by the QRNG via a randomness extractor.

2. The method of claim 1, wherein generating the quantum keys comprises generating one or more quantum access control keys, wherein the quantum encryption keys are configured for use in the secure transmission and the quantum access control keys are configured for use in the access control.

3. The method of claim 1, comprising deleting the quantum keys from the server and the QKT after each use in the secure transmission or the access control.

4. The method of claim 1, wherein generating the quantum keys comprises using a randomness extractor coupled to the QRNG.

5. The method of claim 4, wherein the randomness extractor is executed by a field programmable gate array, FPGA.

6. The method of claim 1, wherein using the quantum key in the secure transmission comprise encrypting/decrypting a message and its digest using the quantum key.

7. The method of claim 1, wherein the using the quantum key in the secure transmission comprises using the server as a relay for secure transmissions between users.

8. A system including a memory device for security applications, the system comprising:
   a quantum random number generator (QRNG) for generating one or more quantum keys;
   a secure network comprising a server and a user device comprising a quantum key token (QKT), wherein corresponding sets of the quantum keys are stored in the server located at a controlled access location and in the QKT, respectively; and
   wherein the server and the user device are configured for using the corresponding sets of quantum keys for secure transmission between the server and the user device when located outside the secure network or for access control to the controlled access location;
   wherein the QRNG is configured for generating one or more quantum encryption keys; and
   wherein the QRNG is configured for limiting a length of the quantum encryption keys to be not greater than the quantum entropy of the keys generated by the QRNG via a randomness extractor.

9. The system of claim 8, wherein the QRNG is configured for generating one or more quantum access control keys, wherein the quantum encryption keys are configured for use in the secure transmission and the quantum access control keys are configured for use in the access control.

10. The system of claim 8, wherein the server and the user device are configured for deleting the quantum keys from the server and the QKT after each use in the secure transmission or the access control.

11. The system of claim 8, wherein the QRNG is configured for using a randomness extractor coupled to the QRNG.

12. The system of claim 11, wherein, wherein the randomness extractor is executed by a field programmable gate array, FPGA.

13. The system of claim 8, wherein the user device and the server are configured for encrypting/decrypting a message and its digest using the quantum key.

14. The system of claim 8, wherein the server is configured to function as a relay for secure transmissions between users.

15. A user device with hardware for a system for security applications, the user device comprising a quantum key token (QKT) configured for storing a set of quantum keys generated by a quantum random number generator (QRNG) via the secure network; and wherein the user device is configured for using the set of quantum keys for secure transmission with a server located at a controlled access location when the user device is located outside the secure network or for access control to the controlled access location;

wherein the quantum keys comprise one or more quantum encryption keys; and wherein a length of the quantum encryption keys is limited to be not greater than the quantum entropy of the keys generated by the QRNG via a randomness extractor.

16. The user device of claim 15, wherein the quantum keys comprise one or more quantum access control keys, wherein the quantum encryption keys are configured for use in the secure transmission and the quantum access control keys are configured for use int the access control.

17. The user device of claim 15, wherein the user device is configured for deleting the quantum keys from the server and the QKT after each use in the secure transmission or the access control.

18. The system of claim 15, wherein the user device is configured for encrypting/decrypting a message and its digest using the quantum key.

19. The system of claim 15, wherein the system for security applications comprises:

a quantum random number generator (QRNG) for generating one or more quantum keys;

a secure network comprising a server and a user device comprising a quantum key token (QKT), wherein corresponding sets of the quantum keys are stored in the server located at a controlled access location and in the QKT, respectively; and wherein the server and the user device are configured for using the corresponding sets of quantum keys for secure transmission between the server and the user device when located outside the secure network or for access control to the controlled access location.

* * * * *